United States Patent
Park et al.

(10) Patent No.: US 9,798,919 B2
(45) Date of Patent: Oct. 24, 2017

(54) METHOD AND APPARATUS FOR ESTIMATING IMAGE MOTION USING DISPARITY INFORMATION OF A MULTI-VIEW IMAGE

(71) Applicant: SAMSUNG ELECTRONICS CO., LTD., Suwon-si (KR)

(72) Inventors: Seung-ho Park, Seoul (KR); Se-hyeok Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 690 days.

(21) Appl. No.: 13/890,791

(22) Filed: May 9, 2013

(65) Prior Publication Data
US 2014/0015936 A1 Jan. 16, 2014

Related U.S. Application Data

(60) Provisional application No. 61/669,757, filed on Jul. 10, 2012.

(30) Foreign Application Priority Data

Sep. 11, 2012 (KR) .................. 10-2012-0100654

(51) Int. Cl.
 *H04N 13/02* (2006.01)
 *G06K 9/00* (2006.01)
 *G06T 7/285* (2017.01)
(52) U.S. Cl.
 CPC .......... *G06K 9/00201* (2013.01); *G06T 7/285* (2017.01)
(58) Field of Classification Search
 CPC ........ H04N 13/02; H04N 13/00; H04N 13/04; H04N 19/436; H04N 19/597;
 (Continued)

(56) References Cited

U.S. PATENT DOCUMENTS 6,430,224 B1 8/2002 Naito et al.
8,179,969 B2 * 5/2012 Ho .................. H04N 13/0059
 375/240.16
(Continued)

FOREIGN PATENT DOCUMENTS

CN 101243692 A 8/2008
CN 101729791 A 6/2010
(Continued)

OTHER PUBLICATIONS

Written Opinion (PCT/ISA/237) dated Aug. 27, 2013 issued by the International Searching Authority in International Application No. PCT/KR2013/003833.

(Continued)

*Primary Examiner* — Trang U Tran
(74) *Attorney, Agent, or Firm* — Sughrue Mion, PLLC

(57) ABSTRACT

A method and apparatus for processing a multi-view image is provided. The method includes: extracting disparity information between an image of a first point of view and an image of a second point of view; and estimating a motion between two sequential images of the first point of view or the second point of view using the extracted disparity information. The apparatus may include a processor which is configured to extract disparity information between an image of a first point of view and an image of a second point of view in the multi-view image and is further configured to estimate a motion using the extracted disparity information between two sequential images of the first point of view or the second point of view.

18 Claims, 11 Drawing Sheets

(58) Field of Classification Search
CPC .... H04N 19/105; H04N 19/136; H04N 19/61; H04N 11/02; H04N 11/04; H04N 7/12
USPC .................................. 348/46, 47, 44, 51, 50
See application file for complete search history.

(56) References Cited

U.S. PATENT DOCUMENTS

| | | | |
|---|---|---|---|
| 8,345,983 | B2 | 1/2013 | Noguchi et al. |
| 8,675,051 | B2 | 3/2014 | Sugimoto |
| 8,736,669 | B2 * | 5/2014 | Naske ................ H04N 13/0011 348/44 |
| 8,767,045 | B2 | 7/2014 | Kitazato et al. |
| 8,913,108 | B2 | 12/2014 | Barenbrug et al. |
| 8,923,399 | B2 | 12/2014 | Yang |
| 9,042,439 | B2 * | 5/2015 | Lee ..................... H04N 19/597 375/240.01 |
| 9,066,096 | B2 * | 6/2015 | Shimizu ............... H04N 19/597 |
| 2006/0232666 | A1 | 10/2006 | Op De Beeck et al. |
| 2007/0041443 | A1 | 2/2007 | Ha et al. |
| 2007/0104276 | A1 | 5/2007 | Ha |
| 2011/0254930 | A1 | 10/2011 | Sugimoto |
| 2012/0014614 | A1 | 1/2012 | Takahashi et al. |
| 2012/0262546 | A1 | 10/2012 | Tsukagoshi |
| 2013/0114699 | A1 | 5/2013 | Kim et al. |
| 2014/0368612 | A1 | 12/2014 | Jeong et al. |

FOREIGN PATENT DOCUMENTS

| | | |
|---|---|---|
| CN | 101755460 A | 6/2010 |
| EP | 1784022 A2 | 5/2007 |
| JP | 11-252586 A | 9/1999 |
| JP | 2009-543508 A | 12/2009 |
| JP | 2011-223493 A | 11/2011 |
| JP | 2011-239169 A | 11/2011 |
| JP | 201223662 A | 2/2012 |
| JP | 2012-60267 A | 3/2012 |
| JP | 2012-505586 A | 3/2012 |
| JP | 2013-187777 A | 9/2013 |
| KR | 1020070011147 A | 1/2007 |
| KR | 1020070022568 A | 2/2007 |
| KR | 1020110139882 A | 12/2011 |
| KR | 1020120002112 A | 1/2012 |
| WO | 2007011147 A1 | 1/2007 |
| WO | 2011/152039 A1 | 12/2011 |

OTHER PUBLICATIONS

International Search Report (PCT/ISA/210) dated Aug. 27, 2013 issued by the International Searching Authority in International Application No. PCT/KR2013/003833.
Communication issued on Mar. 14, 2016 by the State Intellectual Property Office of PR China in related Application No. 201380039625.2.
Communication issued on Jan. 26, 2016 by the Japanese Patent Office in related Application No. 2015-521531.
Communication dated Jun. 26, 2016, issued by the Australian Patent Office in counterpart Australian Application No. 2013287585.
Communication dated Jun. 6, 2016, issued by the European Patent Office in counterpart European Application No. 13816970.1.
Joshua Worby et al: "Establishing Visual Correspondence from Multi-Resolution Graph Cuts for Stereo-Motion", 2007. CRV '07. Fourth Canadian Conference on Computer and Robot Vision, IEEE, PI, May 1, 2007 (May 1, 2007), pp. 313-320, XP031175819 (8 pages total).
Anonymous: "Test Model under Consideration for HEVC based 3D video coding",International Organisation for Standardisation Organisation Internationale De Normalisation ISO/IEC JTC1/SC29/WG11 Coding of Moving Pictures and Audio; ISO/IEC JTC1/SC29/WG11 , MPEG2011/N12559, San Jose, CA, USA, No. N12559, Feb. 11, 2012 (Feb. 11, 2012), XP030019033, (45 pages total).
Communication dated Oct. 4, 2016, from the Japanese Patent Office in counterpart application No. 2015-521531.
Communication dated Nov. 23, 2016, from the State Intellectual Property Office of People's Republic of China in counterpart Application No. 201380039625.2.
Communication dated Jun. 27, 2017 issued by the Japanese Patent and Trademark Office in counterpart Japanese Patent Application No. 2015-521531.

* cited by examiner

METHOD AND APPARATUS FOR ESTIMATING IMAGE MOTION USING DISPARITY INFORMATION OF A MULTI-VIEW IMAGE

CROSS-REFERENCE TO RELATED PATENT APPLICATION

This application claims the benefit of U.S. Provisional Application No. 61/669,757, filed on Jul. 10, 2012, in the USPTO and Korean Patent Application No. 10-2012-0100654, filed on Sep. 11, 2012, in the Korean Intellectual Property Office, the disclosures of which are incorporated herein by reference, in their entirety.

BACKGROUND

1. Field

The method and apparatus relates to a method and apparatus for estimating and processing a motion of a multi-view image by using disparity information of the multi-view image.

2. Description of the Related Art

Motion estimation of multi-view images to generate an image between two images may be performed by a method of estimating a motion between two sequential images or by a method of estimating a motion between two images having different points of view. The latter may be performed by acquiring disparity information, and the former may be performed by acquiring a motion vector.

In this case, when a motion is estimated, between two sequential images, each image having an independent point of view, motion estimation values of the points of view may lack consistency.

SUMMARY

According to an aspect of the inventive concept, there is provided a method of processing a multi-view image. The method includes: extracting disparity information between an image of a first point of view and an image of a second point of view; and using the extracted disparity information to estimate a motion between two sequential images of the first point of view or the second point of view.

The estimating may include: acquiring a corresponding area in images of the first point of view and the second point of view using the extracted disparity information; estimating a motion of the corresponding area between two sequential images of each of the first point of view and the second point of view; and compensating for motion information estimated at each of the first point of view and the second point of view using motion information estimated at the other point of view.

The estimating may include: estimating a motion between two sequential images of the first point of view or the second point of view; and using the extracted disparity information to compensate for estimated motion information between the two sequential images of the first point of view or the second point of view.

The estimating may include: estimating a motion between two sequential images of the first point of view; and estimating a motion between two sequential images of the second point of view using the extracted disparity information and motion information estimated at the first point of view.

The extracting may include extracting, at the same time, disparity information between two images of the first point of view and the second point of view.

A time of extracting at least one of the two sequential images may be equal to or adjacent to a time that the disparity information is extracted.

The estimating may include acquiring a motion vector between the two sequential images of the first point of view or the second point of view.

The method may further include generating an image between the two sequential images of the first point of view or the second point of view based on the estimated motion information.

An exemplary embodiment may provide an apparatus for processing a multi-view image, the apparatus including: a processor which is configured to extract disparity information between an image of a first point of view and an image of a second point of view in the multi-view image and is further configured to estimate a motion using the extracted disparity information between two sequential images of the first point of view or the second point of view. The apparatus may further include a memory which stores the multi-view image.

Another exemplary embodiment may provide an apparatus for processing a multi-view image, the apparatus including: at least two cameras each photographing two objects which are spaced apart from each other and spaced apart from the cameras; and a processor which is configured to extract disparity information between an image of a first point of view taken by a first camera and an image of a second point of view taken by a second camera in the multi-view image and is further configured to estimate a motion using the extracted disparity information between two sequential images of the first point of view or the second point of view.

Another exemplary embodiment may provide an apparatus for processing a multi-view image, the apparatus including: a first motion estimation module which estimates a motion between two sequential images of a first point of view; a second motion estimation module which estimates a motion between two sequential images of a second point of view; and a disparity extraction module which extracts disparity information between an image of the first point of view and an image of the second point of view; wherein the two motion estimation modules estimate a motion between two sequential images based on the extracted disparity information.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EXEMPLARY EMBODIMENTS

Figure 1:
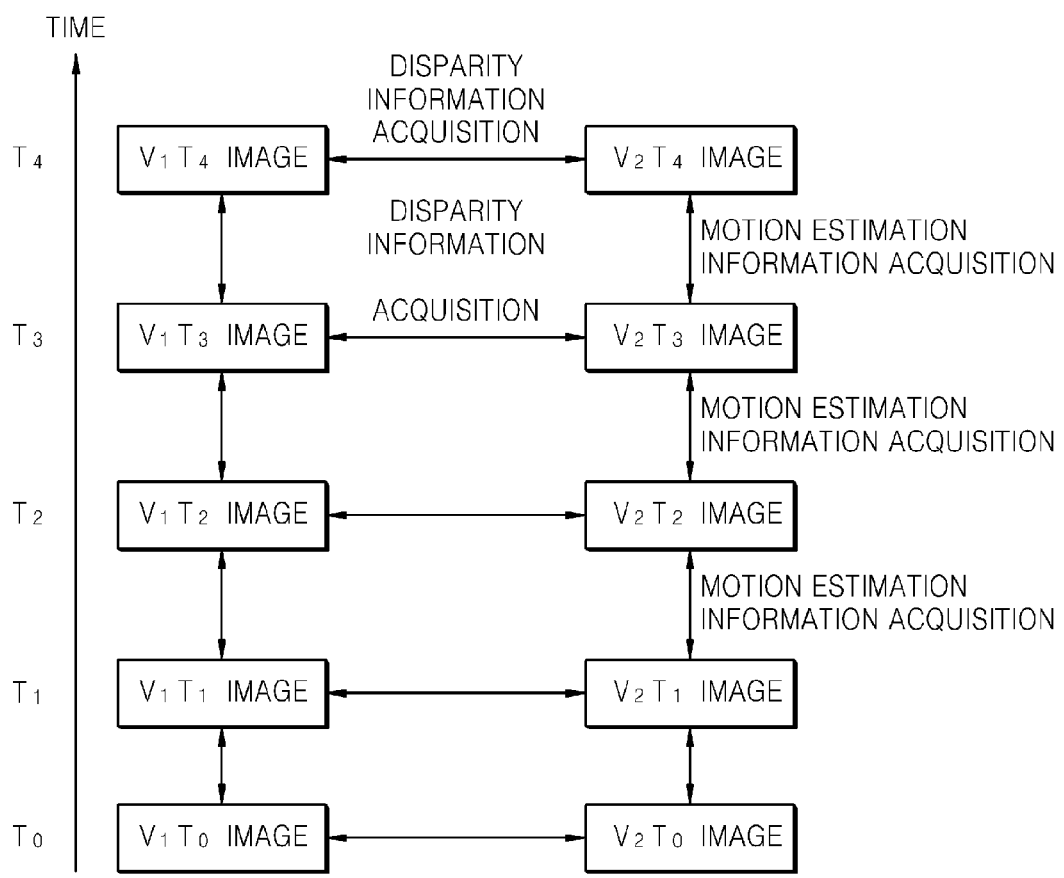
FIG. 1 is a diagram which describes a method of processing a multi-view image, according to an embodiment of the present invention.

Hereinafter, the inventive concept will be described more fully with reference to the accompanying drawings, in which exemplary embodiments of the invention are shown. In the following description and drawings, well-known functions or constructions are not described in detail since they would obscure the invention with unnecessary detail. In addition, like reference numerals denote like elements throughout the specification.

The terminology or words used in the specification and claims described below must not be analyzed as having common or lexical meaning and must be analyzed within the meaning and concept which conforms to the technical spirit of the inventive concept to most properly represent the exemplary embodiments. Therefore, since the exemplary embodiments disclosed in the specification and the configurations shown in the drawings only represent the most exemplary embodiments of the inventive concept and do not represent all of the technical sprit of the inventive concept, it should be understood that various equivalents and modifications for replacing them may exist when the exemplary embodiments of the inventive concept are applied.

Expressions such as "at least one of," when preceding a list of elements, modify the entire list of elements and do not modify the individual elements of the list.

FIG. 1 is a diagram which describes a method of processing a multi-view image, according to an exemplary embodiment of the inventive concept.

Referring to FIG. 1, image data of multi-view images may exist at times $T_0$, $T_1$, $T_2$, $T_3$, and $T_4$ according to each point of view. When a display device capable of displaying a multi-view image displays multi-view images, of which image data along time exists according to each point of view as shown in FIG. 1, it is necessary to acquire motion estimation information between the images to additionally generate an image between every two sequential images, so that images are naturally displayed.

According to an exemplary embodiment of the inventive concept, when a multi-view image processing apparatus additionally generates an image between two sequential images by acquiring motion estimation information between the two sequential images at each point of view of a multi-view image, the motion estimation information between the two sequential images may be acquired by considering a disparity between two points of view in order to strengthen the consistency of temporal motion estimation information between two points of view and to improve the performance of motion estimation.

Figure 2:
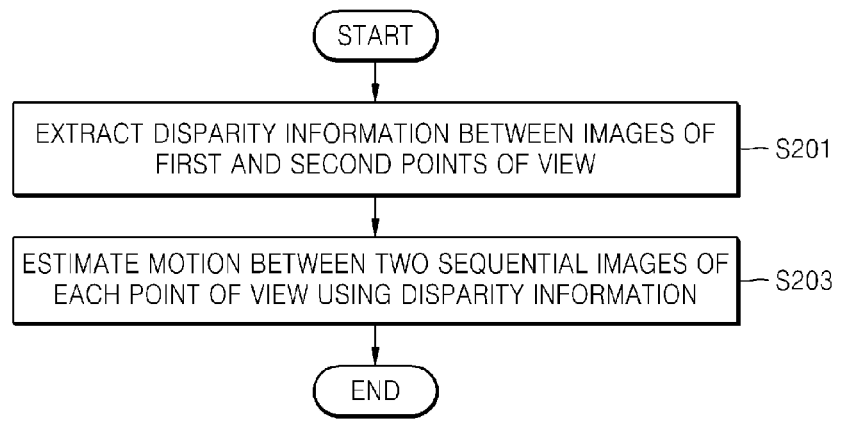
FIG. 2 is a flowchart illustrating a method of processing a multi-view image, according to an exemplary embodiment of the inventive concept.

FIG. 2 is a flowchart which illustrates a method of processing a multi-view image, according to an exemplary embodiment of the inventive concept.

Referring to FIG. 2, in operation S201, a multi-view image processing apparatus according to an exemplary embodiment of the inventive concept extracts disparity information between images of a first point of view and a second point of view. In this case, the images of the first point of view and the second point of view from which the disparity information is extracted may be images taken at the same time, and the disparity information may be extracted from metadata in multi-view image data. A method of extracting disparity information is not limited thereto, and various methods of extracting disparity information may be used.

In operation S203, the multi-view image processing apparatus estimates a motion between two sequential images of each of the first point of view and the second point of view by considering the extracted disparity information. In this case, a time of at least one of the two sequential images may be equal to or adjacent to a time that the disparity information is extracted. In addition, when the multi-view image processing apparatus estimates the motion between the two sequential images of each of the first point of view and the second point of view, the multi-view image processing apparatus may estimate the motion between the two sequential images so that images of the first point of view and the second point of view, which may be generated by motion estimation information, have an estimated disparity.

Figure 3A:
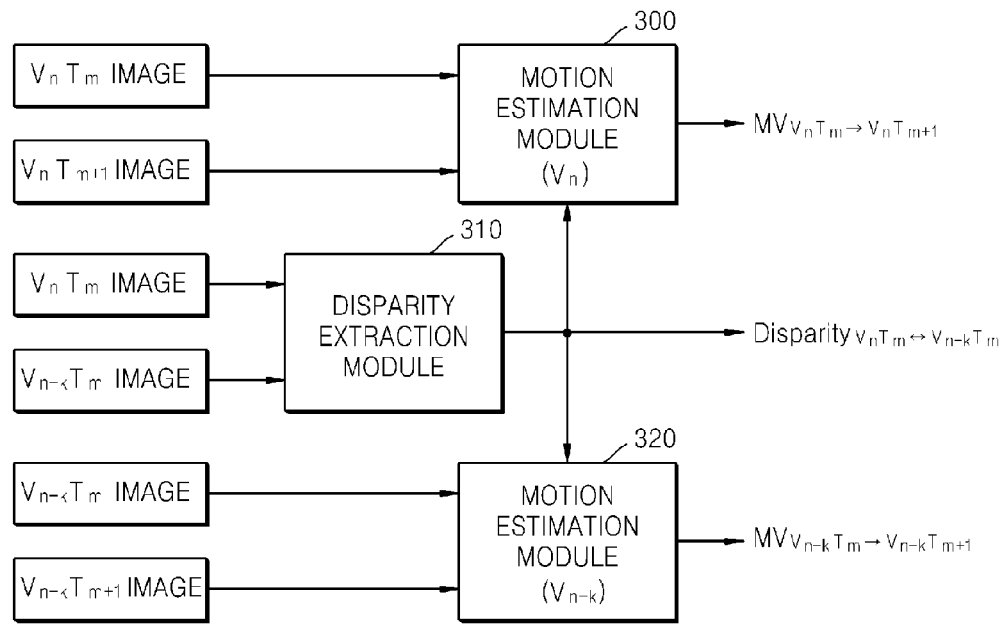
FIGS. 3A and 3B are block diagrams which describe a method of processing a multi-view image, according to an exemplary embodiment of the inventive concept.
Figure 3B:
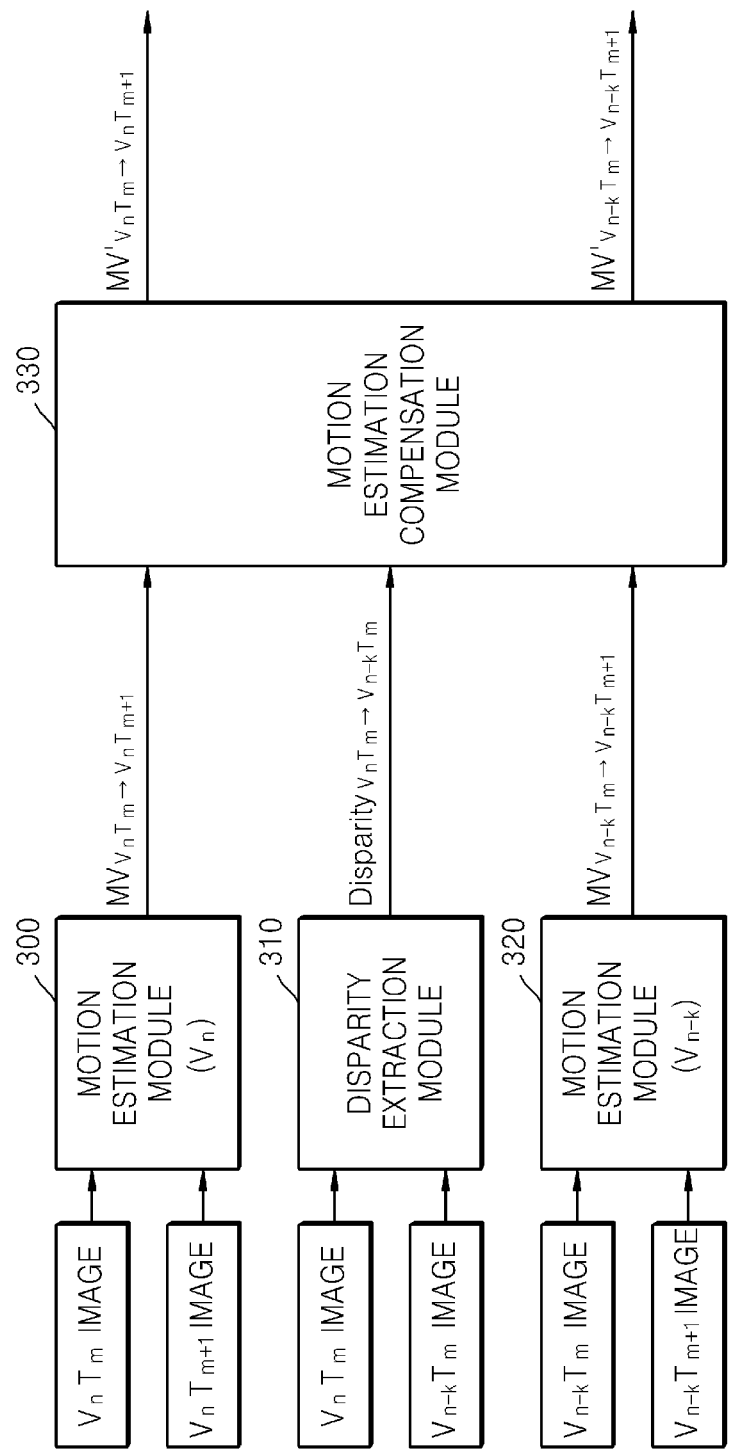

FIGS. 3A and 3B are block diagrams which describe a method of processing a multi-view image, according to an exemplary embodiment of the inventive concept. In FIGS. 3A and 3B, motion estimation modules $V_n$ and $V_{n-k}$ 300 and 320, a disparity extraction module 310, and a motion estimation compensation module 330 may be programs stored in a memory of a multi-view image processing apparatus according to an exemplary embodiment of the inventive concept.

Referring to FIG. 3A, the motion estimation module $V_n$ 300 may estimate a motion between two sequential images $V_nT_m$ and $V_nT_{m+1}$ of a first point of view. In this case, estimable motion information may be represented by a motion vector $MV_{V_nT_m \to V_nT_{m+1}}$. The motion estimation module $V_{n-k}$ 320 may estimate a motion between two sequential images $V_{n-k}T_m$ and $V_{n-k}T_{m+1}$ of a second point of view, and motion information estimated by the motion estimation module $V_{n-k}$ 320 may be represented by a motion vector $MV_{V_{n-k}T_m \to V_{n-k}T_{m+1}}$. The disparity extraction module 310 may extract disparity information $Disparity_{V_nT_m \leftrightarrow V_{n-k}T_m}$ between the image $V_nT_m$ of the first point of view and the image $V_{n-k}T_m$ of the second point of view.

According to an exemplary embodiment, the motion estimation module $V_n$ 300 and the motion estimation module $V_{n-k}$ 320 may estimate a motion between two sequential images by considering the disparity information $Disparity_{V_nT_m \leftrightarrow V_{n-k}T_m}$.

In FIG. 3B, the motion estimation compensation module 330 for compensating for the motion vectors $MV_{V_nT_m \to V_nT_{m+1}}$ and $MV_{V_{n-k}T_m \to V_{n-k}T_{m+1}}$ estimated by the motion estimation modules $V_n$ and $V_{n-k}$ 300 and 320 may be further included.

Referring to FIG. 3B, the motion estimation compensation module 330 may compensate for the motion vectors $MV_{V_nT_m \to V_nT_{m+1}}$ and $MV_{V_{n-k}T_m \to V_{n-k}T_{m+1}}$ estimated by the motion estimation modules $V_n$ and $V_{n-k}$ 300 and 320 by considering the disparity information $Disparity_{V_nT_m \leftrightarrow V_{n-k}T_m}$, or motion estimation information $MV_{V_{n-k}T_m \to V_{n-k}T_{m+1}}$ or $MV_{V_nT_m \to V_nT_{m+1}}$ of the other point of view, respectively.

In particular, the motion estimation compensation module 330 may compensate for the motion estimation information $MV_{V_{n-k}T_m \to V_{n-k}T_{m+1}}$ of the second point of view using the disparity information $Disparity_{V_nT_m \leftrightarrow V_{n-k}T_m}$ or the motion estimation information $MV_{V_nT_m \to V_nT_{m+1}}$ of the first point of view. The compensated motion estimation information of the second point of view may be represented by a motion vector $MV'_{V_{n-k}T_m \to V_{n-k}T_{m+1}}$.

In addition, the motion estimation compensation module 330 may compensate for the motion estimation information $MV_{V_nT_m \to V_nT_{m+1}}$ of the first point of view using the disparity information $Disparity_{V_nT_m \leftrightarrow V_{n-k}T_m}$ or the motion estimation information $MV_{V_{n-k}T_m \to V_{n-k}T_{m+1}}$ of the second point of view. The compensated motion estimation information of the first point of view may be represented by a motion vector $MV'_{V_nT_m \to V_nT_{m+1}}$.

Figure 4:
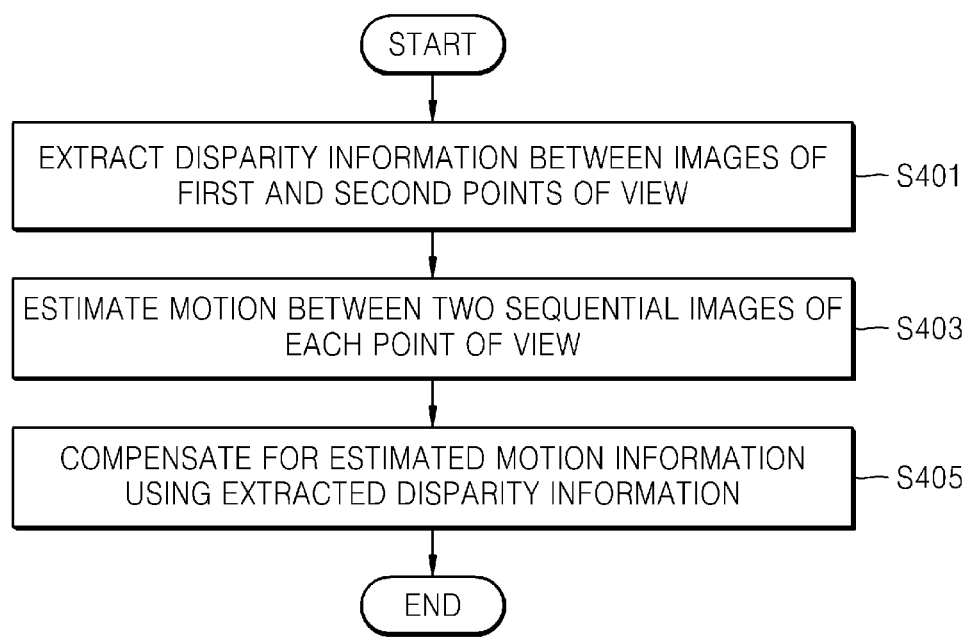
FIG. 4 is a flowchart illustrating the method of FIGS. 3A and 3B according to an exemplary embodiment of the inventive concept.

FIG. 4 is a flowchart illustrating the method of FIGS. 3A and 3B according to an exemplary embodiment of the inventive concept.

Referring to FIG. 4, in operation S401, a multi-view image processing apparatus according to an exemplary embodiment of the inventive concept extracts disparity information between an image of the first point of view and an image of the second point of view. In operation S403, the multi-view image processing apparatus estimates a motion between two sequential images of each of the first point of view and the second point of view. In operation S405, the multi-view image processing apparatus compensates for the motion information estimated in operation S403 using the extracted disparity information. For example, the motion information may be compensated for so that an image of the first point of view and an image of the second point of view, which may be generated by motion information, have a disparity which corresponds to the extracted disparity information.

Figure 5:
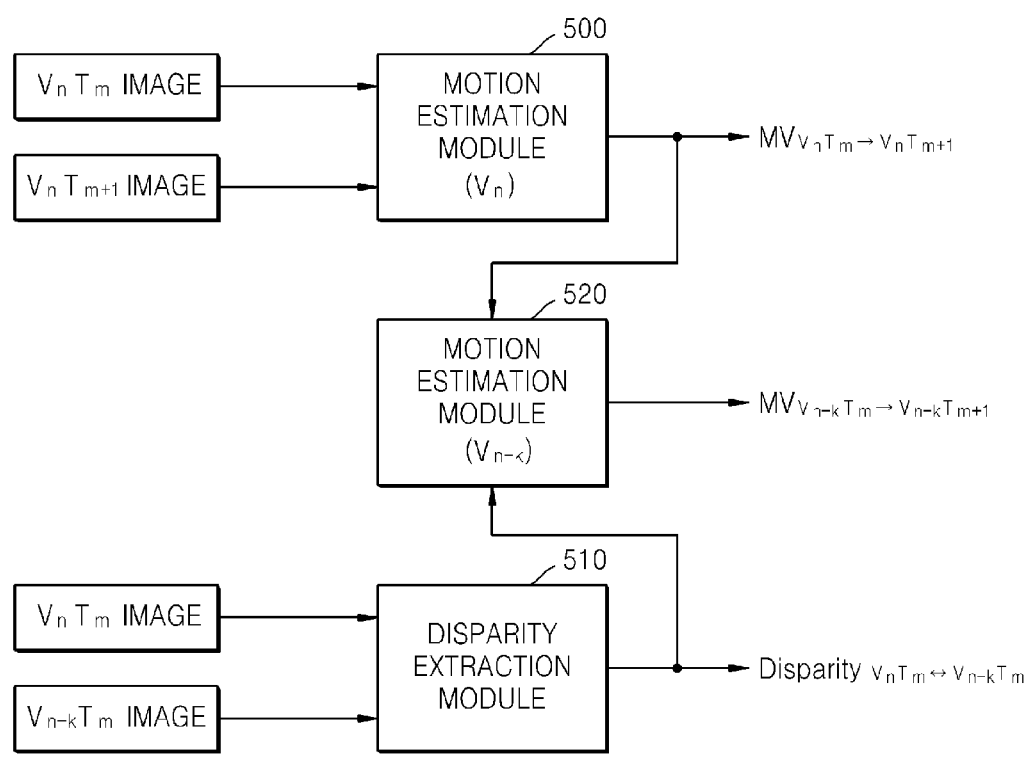
FIG. 5 is a block diagram for describing a method of processing a multi-view image, according to another exemplary embodiment of the inventive concept.

FIG. 5 is a block diagram which describes a method of processing a multi-view image, according to another exemplary embodiment of the inventive concept. In FIG. 5, motion estimation modules $V_n$ and $V_{n-k}$ 500 and 520 and a disparity extraction module 510 may be programs stored in a memory of a multi-view image processing apparatus according to an exemplary embodiment of the inventive concept.

Referring to FIG. 5, the motion estimation module $V_n$ 500 may estimate a motion between two sequential images $V_nT_m$ and $V_nT_{m+1}$ of a first point of view. In this case, estimable motion information may be represented by a motion vector $MV_{V_nT_m \to V_nT_{m+1}}$. The motion estimation module $V_{n-k}$ 520 may estimate a motion between two sequential images $V_{n-k}T_m$ and $V_{n-k}T_{m+1}$ of a second point of view, and motion information estimable by the motion estimation module $V_{n-k}$ 520 may be represented by a motion vector $MV_{V_{n-k}T_m \to V_{n-k}T_{m+1}}$. The disparity extraction module 510 may extract disparity information $Disparity_{V_nT_m \leftrightarrow V_{n-k}T_m}$ between the image $V_nT_m$ of the first point of view and the image $V_{n-k}T_m$ of the second point of view.

According to an exemplary embodiment, the motion estimation module $V_{n-k}$ 520 may estimate motion information between two sequential images $V_{n-k}T_m$ and $V_{n-k}T_{m+1}$ of the second point of view using the disparity information $Disparity_{V_nT_m \leftrightarrow V_{n-k}T_m}$ and motion information acquirable by the motion vector $MV_{V_nT_m \to V_nT_{m+1}}$, and the motion information may be acquired as the motion vector $MV_{V_{n-k}T_m \to V_{n-k}T_{m+1}}$. In other words, According to an exemplary embodiment, the multi-view image processing apparatus may estimate motion information of one point of view using disparity information between the two points of view and may estimate motion information of the other point of view.

Figure 6:
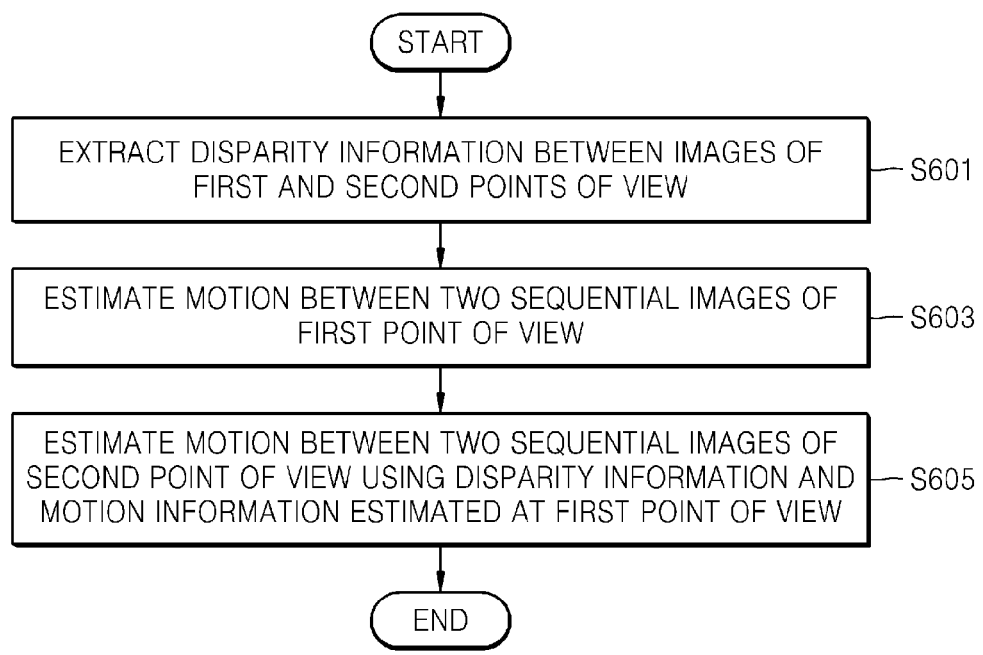
FIG. 6 is a flowchart illustrating the method of FIG. 5 according to another exemplary embodiment of the inventive concept.

FIG. 6 is a flowchart illustrating the method of FIG. 5 according to another exemplary embodiment of the inventive concept.

Referring to FIG. 6, in operation S601, the multi-view image processing apparatus extracts disparity information between an image of a first point of view and an image of a second point of view. In operation S603, the multi-view image processing apparatus estimates a motion between two sequential images of the first point of view. In operation S605, the multi-view image processing apparatus estimates a motion between two sequential images of the second point of view using the disparity information and the estimated motion information of the first point of view. For example, the motion information of the second point of view may be estimated so that an image of the second point of view has the extracted disparity from a corresponding image of the first point of view, which may be generated based on the motion information estimated at the first point of view.

FIGS. 7A to 8C are multi-view images according to an exemplary embodiment of the inventive concept.

Figure 7A:
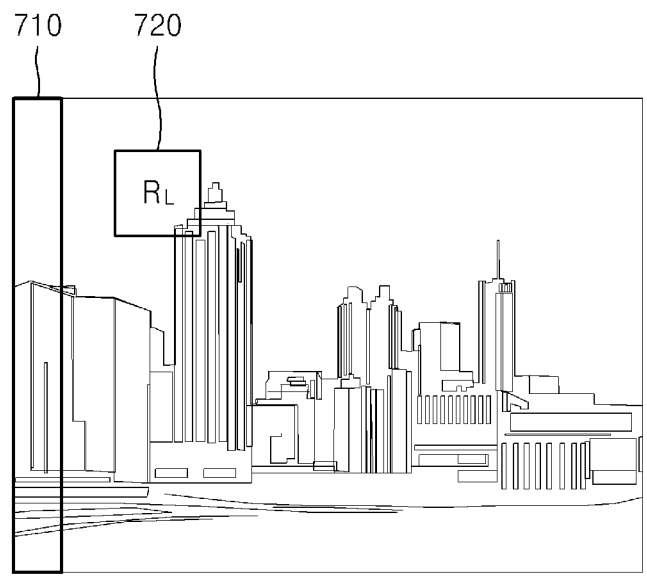
FIGS. 7A to 8C are multi-view images according to an exemplary embodiment of the inventive concept.
Figure 7B:
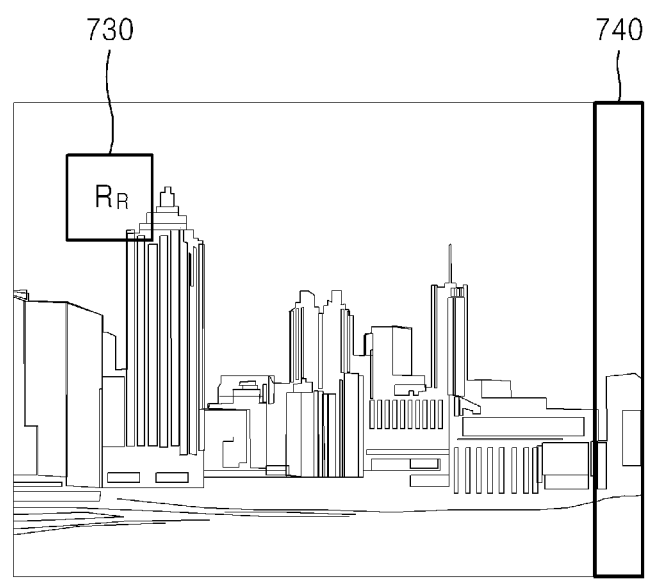

FIGS. 7A and 7B show two images of different points of view, which are captured by two cameras at the same time. Referring to FIGS. 7A and 7B, in a multi-view image, images generated with respect to different points of view have a global difference due to a position difference between the two cameras. A left area 710 of the image shown in FIG. 7A is not shown in FIG. 7B. In addition, a right area 740 of the image shown in FIG. 7B is not shown in FIG. 7A. If the image shown in FIG. 7A is moved to the right, the moved image may be similar to the image shown in FIG. 7B.

Accordingly, a multi-view image processing apparatus according to an exemplary embodiment of the inventive concept may acquire a corresponding area 730 in FIG. 7B, which corresponds to a current area 720 in FIG. 7A, using disparity information.

Figure 8A:
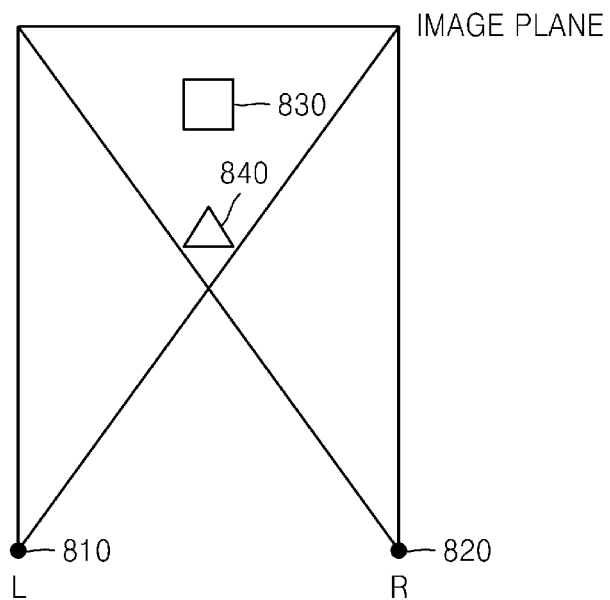
Figure 8B:
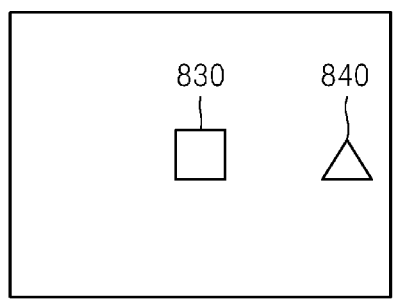
Figure 8C:
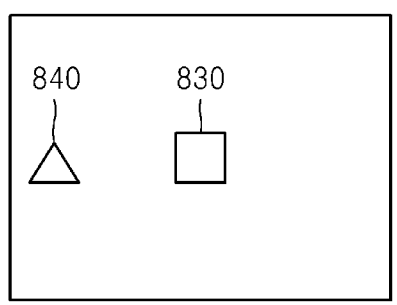

FIG. 8A shows cameras 810 and 820, each photographing two objects 830 and 840, positions of which are apart from the cameras 810 and 820 and are different from each other. FIG. 8B shows an image captured by the camera 810 located on the left side of FIG. 8A, and FIG. 8C shows an image captured by the camera 820 located on the right side of FIG. 8A. When the two objects 830 and 840, positions of which are apart from an image plane and are different, are photographed by the cameras 810 and 820 at different positions, as shown in FIG. 8A, disparities of the objects 830 and 840 are different from each other as shown in FIGS. 8B and 8C. Referring to FIGS. 8B and 8C, a disparity of the object 830 apart farther from the cameras 810 and 820 is less than a disparity of the object 840 apart nearer from the cameras 810 and 820. That is, a disparity of each area in a multi-view image may vary according to a distance between an object and cameras. Thus, the multi-view image processing apparatus may extract disparity information for each area in a multi-view image and may estimate a motion between images by acquiring a corresponding area of each area using the disparity information, thereby improving the performance of the motion estimation performance.

Figure 9:
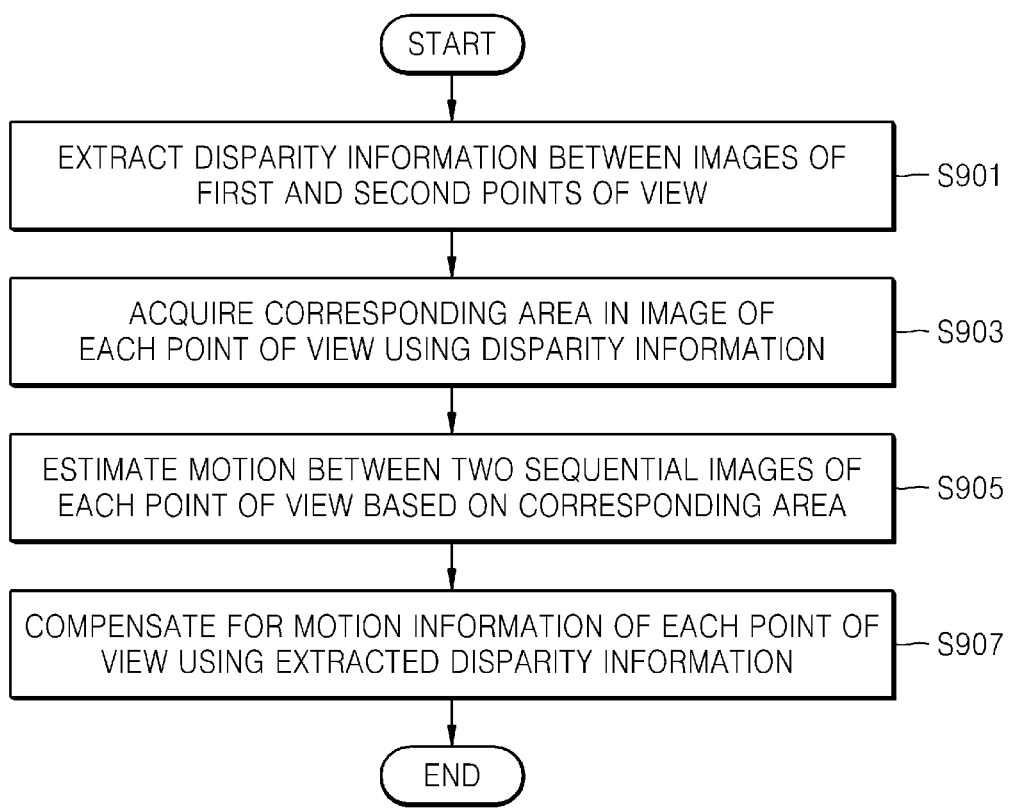
FIG. 9 is a flowchart which illustrates a method of processing a multi-view image by acquiring a corresponding area, according to another exemplary embodiment of the inventive concept.

FIG. 9 is a flowchart which illustrates a method of processing a multi-view image by acquiring a corresponding area, according to another exemplary embodiment of the inventive concept.

Referring to FIG. 9, in operation S901, a multi-view image processing apparatus according to an exemplary embodiment of the inventive concept extracts disparity information between an image of a first point of view and an image of a second point of view. In operation S903, the multi-view image processing apparatus acquires a corresponding area in an image of each of the first point of view and the second point of view. In operation S905, the multi-view image processing apparatus estimates a motion between two sequential images of each of the first point of view and the second point of view based on the corresponding area. In operation S907, the multi-view image processing apparatus compensates for the motion information estimated in operation S905 using the extracted disparity information based on the corresponding area.

Figure 10:
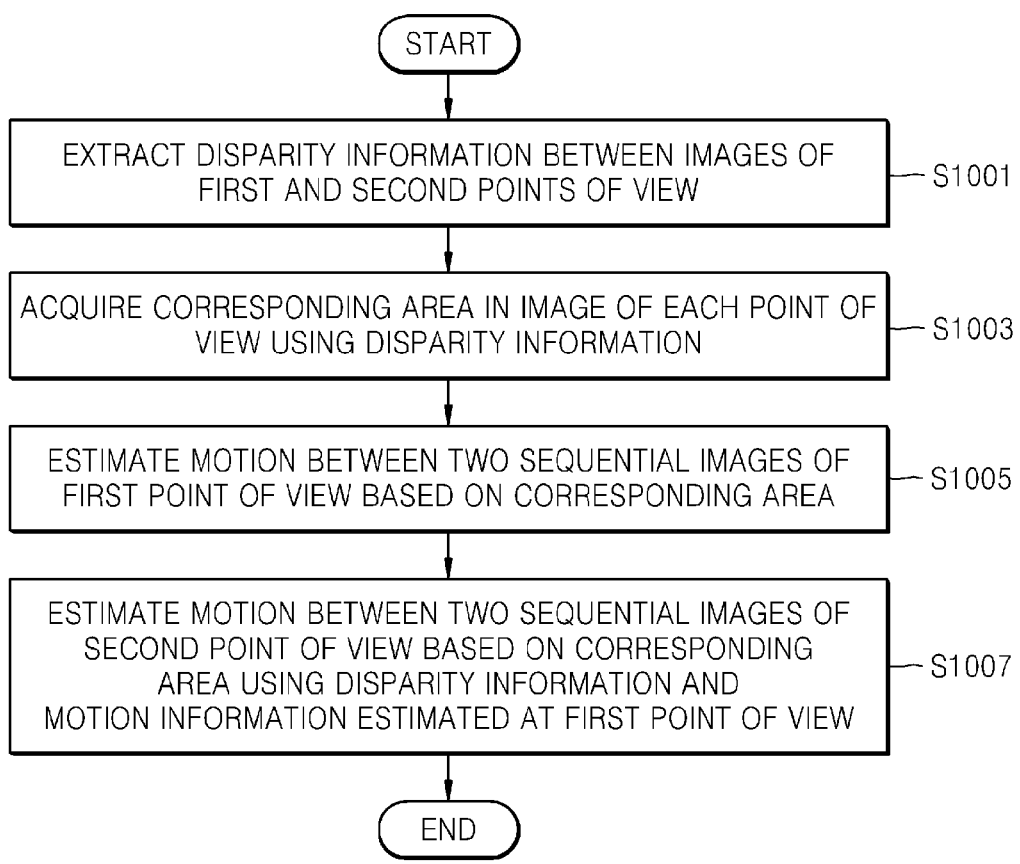
FIG. 10 is a flowchart illustrating a method of processing a multi-view image by acquiring a corresponding area, according to another exemplary embodiment of the inventive concept.

FIG. 10 is a flowchart which illustrates a method of processing a multi-view image by acquiring a corresponding area, according to another exemplary embodiment of the inventive concept.

Referring to FIG. 10, in operation S1001, a multi-view image processing apparatus according to an exemplary embodiment of the inventive concept extracts disparity information between an image of a first point of view and an image of a second point of view. In operation S1003, the multi-view image processing apparatus acquires a corresponding area in an image of each of the first point of view and the second point of view. In operation S1005, the multi-view image processing apparatus estimates a motion between two sequential images of the first point of view based on the corresponding area. In operation S1007, the multi-view image processing apparatus estimates a motion between two sequential images of the second point of view based on the corresponding area using the disparity information and the motion information estimated at the first point of view. For example, the motion information of the second point of view may be estimated based on the corresponding area so that an image of the second point of view has the extracted disparity from a corresponding image of the first point of view, which may be generated based on the motion information estimated at the first point of view.

Figure 11:
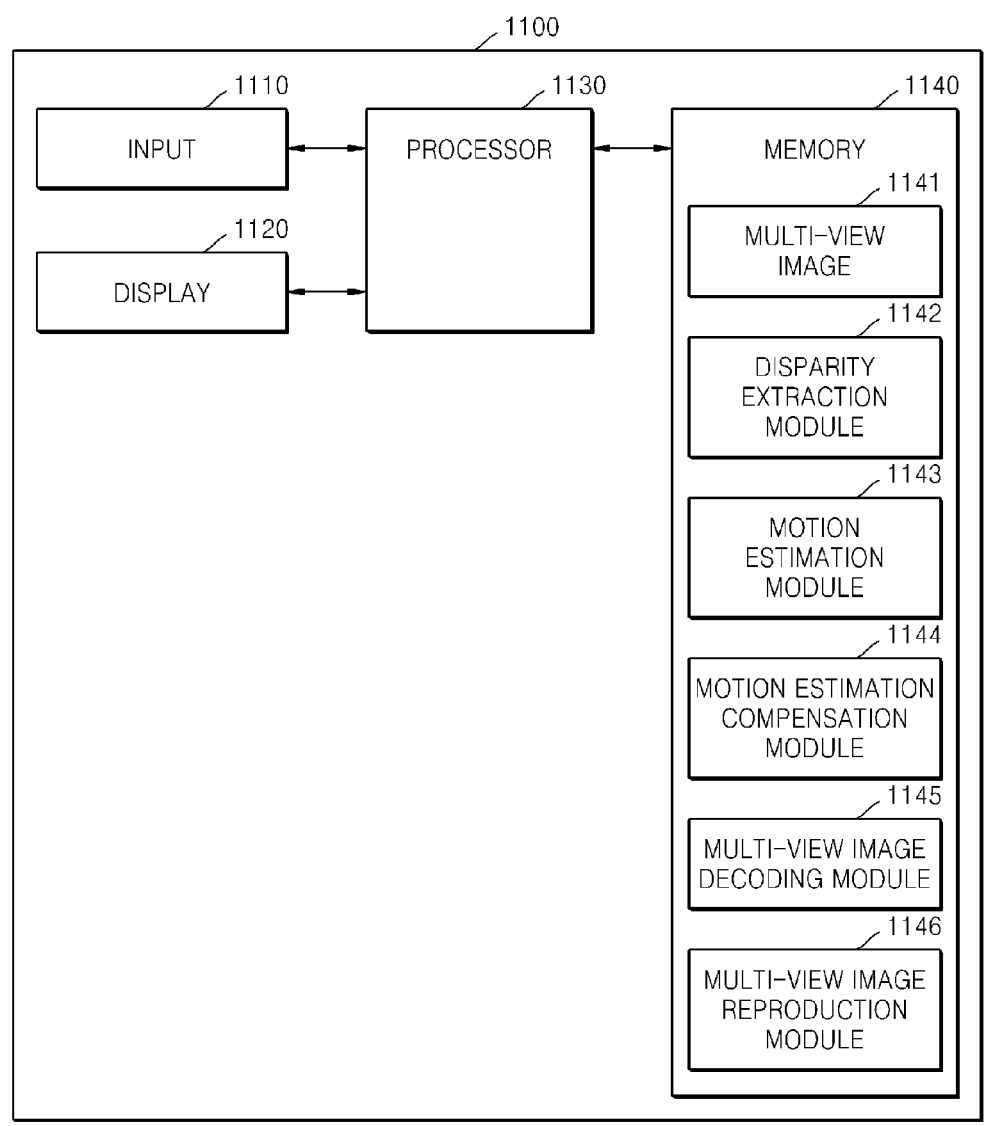
FIG. 11 is a block diagram of an apparatus for processing a multi-view image, according to an exemplary embodiment of the inventive concept.

FIG. 11 is a block diagram of an apparatus 1100 for processing a multi-view image, according to an exemplary embodiment of the inventive concept.

Referring to FIG. 11, the apparatus 1100 may include a memory 1140 which stores a multi-view image 1141 and programs for processing the multi-view image 1141, and a processor 1130 which processes the multi-view image 1141. The apparatus 1100 may further include a display 1120 which displays a processed multi-view image and an input unit 1110 which receives an input from a user.

The processor 1130 may process the multi-view image 1141 by executing the programs stored in the memory 1140. The programs stored in the memory 1140 may be classified into a plurality of modules according to their functions, e.g., a disparity extraction module 1142, a motion estimation module 1143, a motion estimation compensation module 1144, a multi-view image decoding module 1145, and a multi-view image reproduction module 1146.

The disparity extraction module 1142 may extract disparity information between an image of a first point of view and an image of a second point of view. The extracted disparity information may relate to an entire image or a partial image. The images of the first point of view and the second point of view, from which the disparity information is extracted, may be generated at the same time.

The motion estimation module 1143 may estimate a motion between two sequential images of the first point of view or the second point of view based on the extracted disparity information. When disparity information is different according to each area in an image, the motion estimation module 1143 may acquire a corresponding area of each of the first point of view and the second point of view using the disparity information and perform motion estimation on each corresponding area.

According to an exemplary embodiment of the inventive concept, the motion estimation module 1143 may estimate a motion between two sequential images of each of the first point of view and the second point of view and compensate for motion information estimated at each of the first point of view and the second point of view, using disparity information.

According to another exemplary embodiment of the inventive concept, the motion estimation module 1143 may estimate a motion between two sequential images of the first point of view, and may estimate a motion between two sequential images of the second point of view using disparity information and the motion information estimated at the first point of view. The first point of view and the second point of view are not limited to specific points of view. A time of at least one of the two sequential images may be equal or adjacent to a time the disparity information is extracted. That is, the motion estimation module 1143 may estimate temporally changed motion information of an image at the time the disparity information is extracted. In addition, the motion estimation module 1143 may estimate a motion between sequential images by acquiring a motion vector.

The motion estimation compensation module 1144 may compensate for an estimated motion vector by considering disparity information or motion estimation information of another point of view.

In particular, the motion estimation compensation module 1144 may compensate for motion information estimated at the second point of view using disparity information or motion information estimated at the first point of view. In addition, the motion estimation compensation module 1144 may compensate for motion information estimated at the first point of view using disparity information or motion information estimated at the second point of view.

The multi-view image decoding module 1145 may generate an image between two sequential images of each point of view using the motion information estimated by the motion estimation module 1143 or the motion information compensated by the motion estimation compensation module 1144.

The multi-view image reproduction module 1146 may control the display 1120 to display a multi-view image using the image generated by the multi-view image decoding module 1145. According to an exemplary embodiment of the inventive concept, the multi-view image reproduction module 1146 may control the display 1120 to display images using the image generated by the multi-view image decoding module 1145.

The inventive concept can also be embodied as computer-readable codes on a non-transitory computer-readable recording medium. The non-transitory computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and so forth.

While the inventive concept has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of processing a multi-view image, the method comprising:
   extracting disparity information between an image of a first point of view and an image of a second point of view;
   estimating a motion between two sequential images of the first point of view and a motion between two sequential images of the second point of view; and
   generating intermediate image data for each point of view using the estimated motion,
   wherein the estimating comprises acquiring a motion vector between the two sequential images of the first point of view and a motion vector between the two sequential images of the second point of view, and
   compensating the motion vector between the two sequential images of the first point of view using the extracted disparity information and compensating the motion vector between the two sequential images of the second point of view using the extracted disparity information, and
   wherein the motion vector for each point of view is compensated so that the intermediate image data for each point of view have a disparity which corresponds to the extracted disparity information.

2. The method of claim 1, wherein the estimating comprises:
   acquiring a corresponding area in images of the first point of view and the second point of view using the extracted disparity information;
   estimating a motion between two sequential images of each of the first point of view and the second point of view based on the corresponding area; and
   compensating for motion information estimated at each of the first point of view and the second point of view using motion information estimated at the other point of view.

3. The method of claim 1, wherein the estimating comprises:
   estimating a motion between two sequential images of the first point of view; and
   estimating a motion between two sequential images of the second point of view using the extracted disparity information and motion information estimated at the first point of view.

4. The method of claim 1, wherein the extracting comprises extracting at the same time disparity information between two images of the first point of view and the second point of view.

5. The method of claim 4, wherein a time where at least one of the two sequential images is equal to or adjacent to a time that the disparity information is extracted.

6. The method of claim 1, wherein the estimating comprises:
   estimating a motion between two sequential images of each of the first point of view and the second point of view; and
   compensating motion information estimated at the second point of view using the extracted disparity information or motion information estimated at the first point of view.

7. The method of claim 1, wherein the estimating comprises:
   estimating a motion between two sequential images of each of the first point of view and the second point of view; and
   compensating motion information estimated at the first point of view using the extracted disparity information or motion information estimated at the second point of view.

8. An apparatus for processing a multi-view image, the apparatus comprising:
   a memory for storing a multi-view image; and
   a processor which extracts disparity information between an image of a first point of view and an image of a second point of view in the multi-view image, estimates a motion between two sequential images of the first point of view and a motion between two sequential images of the second point of view, and generates intermediate image data for each point of view using the estimated motion,
   wherein the estimating comprises acquiring a motion vector between the two sequential images of the first point of view and a motion vector between the two sequential images of the second point of view, and
   compensating the motion vector between the two sequential images of the first point of view using the extracted disparity information and compensating the motion vector between the two sequential images of the second point of view using the extracted disparity information, and
   wherein the motion vector for each point of view is compensated so that the intermediate image data for each point of view have a disparity which corresponds to the extracted disparity information.

9. The apparatus of claim 8, wherein the processor acquires a corresponding area in images of the first point of view and the second point of view using the extracted disparity information, estimates a motion between two sequential images of each of the first point of view and the second point of view based on the corresponding area, and compensates for motion information estimated at each of the first point of view and the second point of view using motion information estimated at the other point of view.

10. The apparatus of claim 8, wherein the processor estimates a motion between two sequential images of the first point of view or the second point of view and compensates estimated motion information between the two sequential images of the first point of view or the second point of view using the extracted disparity information.

11. The apparatus of claim 8, wherein the processor estimates a motion between two sequential images of the first point of view and estimates a motion between two sequential images of the second point of view using the extracted disparity information and the motion information estimated at the first point of view.

12. The apparatus of claim 8, wherein the processor extracts, at the same time, disparity information between two images of the first point of view and the second point of view.

13. The apparatus of claim 12, wherein a time of at least one of the two sequential images is equal to or adjacent to a time the disparity information is extracted.

14. The apparatus of claim 8, wherein the processor estimates a motion between two sequential images of each of the first point of view and the second point of view and compensates motion information estimated at the second point of view using the extracted disparity information or motion information estimated at the first point of view.

15. The apparatus of claim 8, wherein the processor estimates a motion between two sequential images of each of the first point of view and the second point of view and compensates motion information estimated at the first point of view using the extracted disparity information or motion information estimated at the second point of view.

16. A non-transitory computer-readable recording medium storing a computer-readable program which executes a method of processing a video signal, wherein the program, when executed by a processor of a computer causes the computer to execute a method comprising:
- extracting disparity information between an image of a first point of view and an image of a second point of view;
- estimating a motion between two sequential images of the first point of view and a motion between two sequential images of the second point of view; and
- generating intermediate data for each point of view using the estimated motion,
- wherein the estimating comprises acquiring a motion vector between the two sequential images of the first point of view and a motion vector between the two sequential images of the second point of view, and
- compensating the motion vector between the two sequential images of the first point of view using the extracted disparity information and compensating the motion vector between the two sequential images of the second point of view using the extracted disparity information, and
- wherein the motion vector for each anoint of view is compensated so that the intermediate image data for each point of view have a disparity which corresponds to the extracted disparity information.

17. An apparatus for processing a multi-view image, the apparatus comprising:
- at least two cameras each photographing two objects which are spaced apart from each other and spaced apart from the cameras; and
- a processor which is configured to extract disparity information between an image of a first point of view taken by a first camera and an image of a second point of view taken by a second camera in the multi-view image and is further configured to estimate a motion between two sequential images of the first point of view and a motion between two sequential images of the second point of view,
- wherein the estimating comprises acquiring a motion vector between the two sequential images of the first point of view and a motion vector between the two sequential images of the second point of view, and
- compensating the motion vector between the two sequential images of the first point of view using the extracted disparity information and compensating the motion vector between the two sequential images of the second point of view using the extracted disparity information.

18. An apparatus for processing a multi-view image, the apparatus comprising:
- a first motion estimation module which estimates a motion between two sequential images of a first point of view;
- a second motion estimation module which estimates a motion between two sequential images of a second point of view;
- a disparity extraction module which extracts disparity information between an image of the first point of view and an image of the second point of view; and
- a motion estimation compensation module which compensates the estimated motion between the two sequential images of the first point of view and the estimated motion between the two sequential images of the second point of view,
- wherein the first motion estimation module acquires a motion vector between the two sequential images of the first point of view and the second motion estimation module acquires a motion vector between the two sequential images of the second point of view, and
- wherein the motion estimation compensation module compensates the motion vector between the two sequential images of the first point of view using the extracted disparity information and compensates the motion vector between the two sequential images of the second point of view using the extracted disparity information.

* * * * *